United States Patent [19]

Horwitz

[11] 4,233,756
[45] Nov. 18, 1980

[54] AIRCRAFT FLIGHT SIMULATING INSTRUMENT TRAINER

[75] Inventor: Joshua Horwitz, Magnolia, Mass.

[73] Assignee: Pacer Systems, Inc., Burlington, Mass.

[21] Appl. No.: 748,116

[22] Filed: Dec. 6, 1976

[51] Int. Cl.$^2$ .............................................. G09B 9/08
[52] U.S. Cl. .................................. 35/12 F; 35/10.23; 35/12 W
[58] Field of Search ................... 35/10.2, 11 A, 12 R, 35/12 F, 12 N, 12 W, 12 S, 12 Q, 10, 13; 358/104; 340/27 NA; 273/1 E; 364/480, 801, 802, 805

[56] References Cited

U.S. PATENT DOCUMENTS

| | | | |
|---|---|---|---|
| 2,930,143 | 3/1960 | Dehmel | 35/12 W |
| 3,004,351 | 10/1961 | Hunt et al. | 35/12 W |
| 3,471,627 | 10/1969 | Ziegler | 35/12 W X |
| 3,513,246 | 5/1970 | Fisch et al. | 35/12 W X |
| 3,679,880 | 7/1972 | Carver | 35/10.2 X |
| 3,694,930 | 10/1972 | Howland et al. | 35/12 F |
| 3,823,871 | 7/1974 | Patmore et al. | 35/12 W X |
| 3,831,172 | 8/1974 | Olliges et al. | 35/12 Q X |
| 3,885,325 | 5/1975 | Sidoti | 35/12 F |
| 3,913,245 | 10/1975 | McCanney | 35/12 Q |
| 4,019,039 | 4/1977 | Fontaine | 35/10 UX |

FOREIGN PATENT DOCUMENTS 830686  3/1960  United Kingdom ..................... 35/10.2

*Primary Examiner*—Vance Y. Hum
*Attorney, Agent, or Firm*—James Creighton Wray

[57] ABSTRACT

A flight simulator instrument trainer has operational controls and instruments similar to a conventional aircraft. An AC driven position simulator moves a simulated station position according to simulated power, attitude, flap condition direction and distance traveled to control simulated ADF, ILS and VOR instruments. Angularly offset phases are generated and are provided to potentiometers on directional instruments. Wipers on the potentiometers move with simulated direction indicators. Signals from the wipers are fed to other devices, and phases are compared with one of two ninety degree offset reference phases. The latter are shifted according to simulated flight characteristics, and the thus-varied output of the phase comparators are used to drive instruments and to shift angle position accumulators and distance position accumulators. Logic arrays control initiating signals which prevent attitude and altitude instrument changes until flight conditions are reached and indicate stalls and prevent stall indications during touchdown. An astable vibrator applies minor amplitude perturbations to motor drives for simulated altimeters and directional and attitude instruments. A stable vibrator provides selectively and cyclically variable counts which are converted to analog turbulence signals. The vibrator and a counter also provide signals to an up-down counter for a flap position indicator. Throttle setting controls an engine power signal and a count down counter to produce fuel consumption indications and engine sound. The counter is reset by a simulated fuel tank change switch.

19 Claims, 18 Drawing Figures

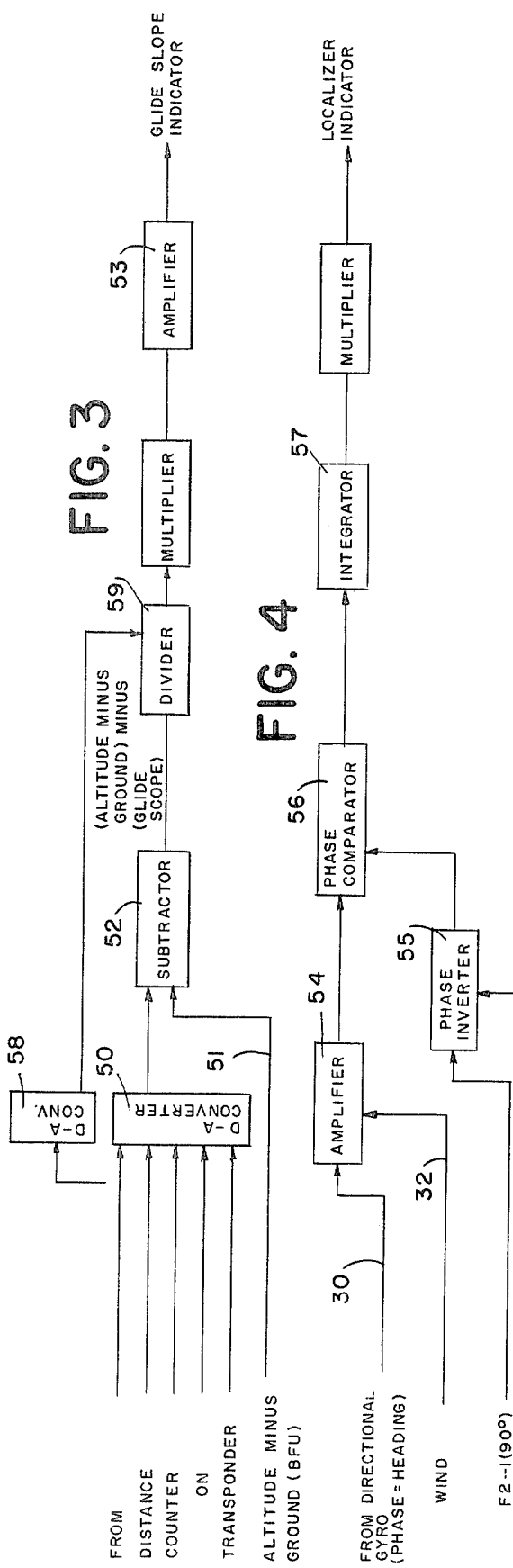

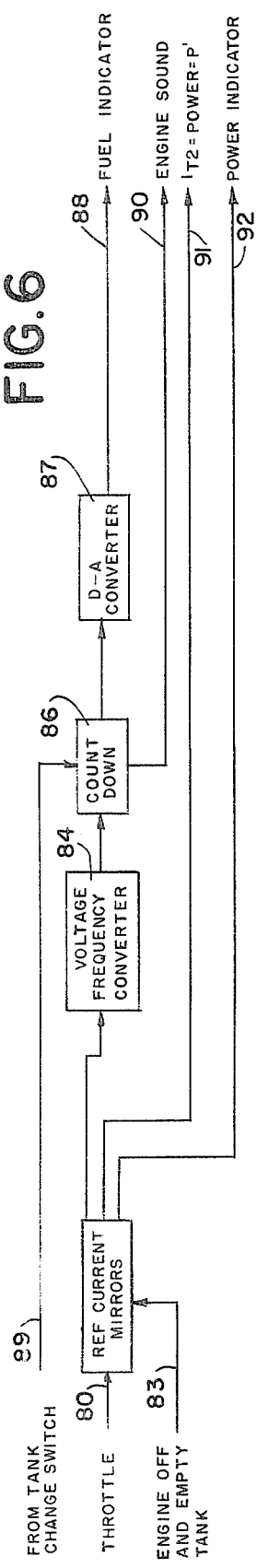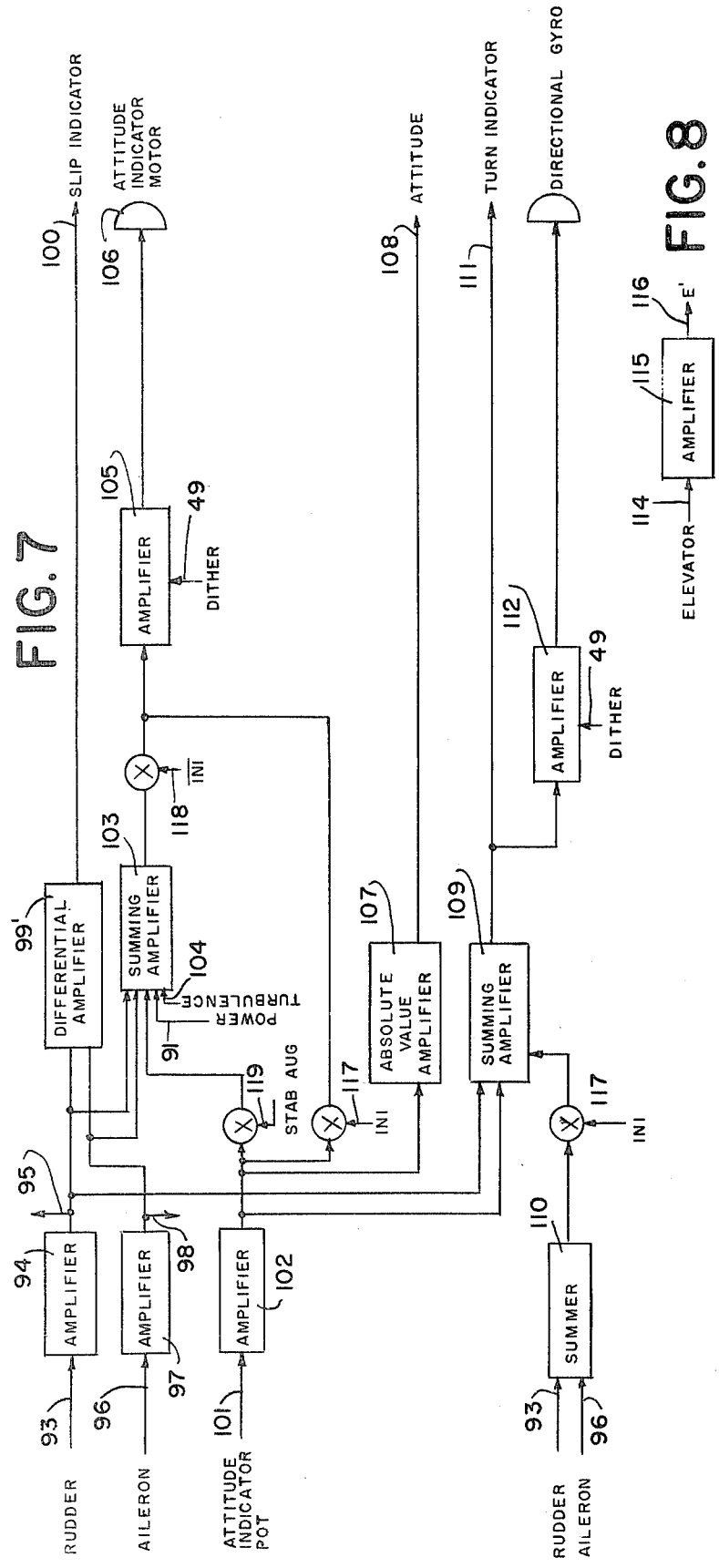

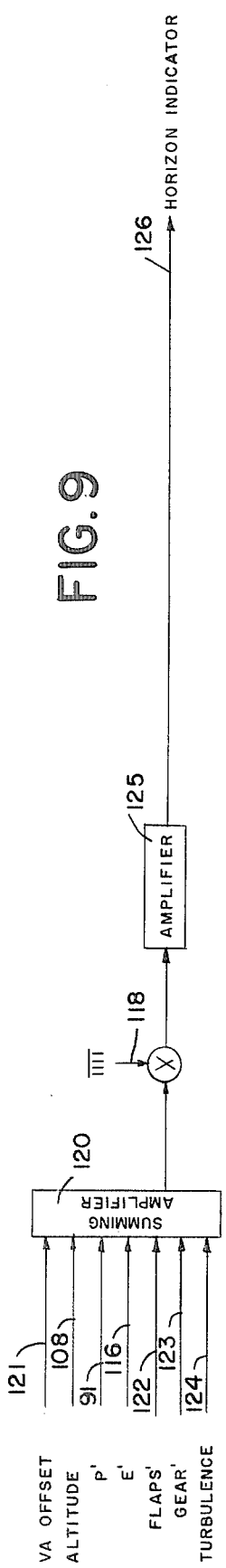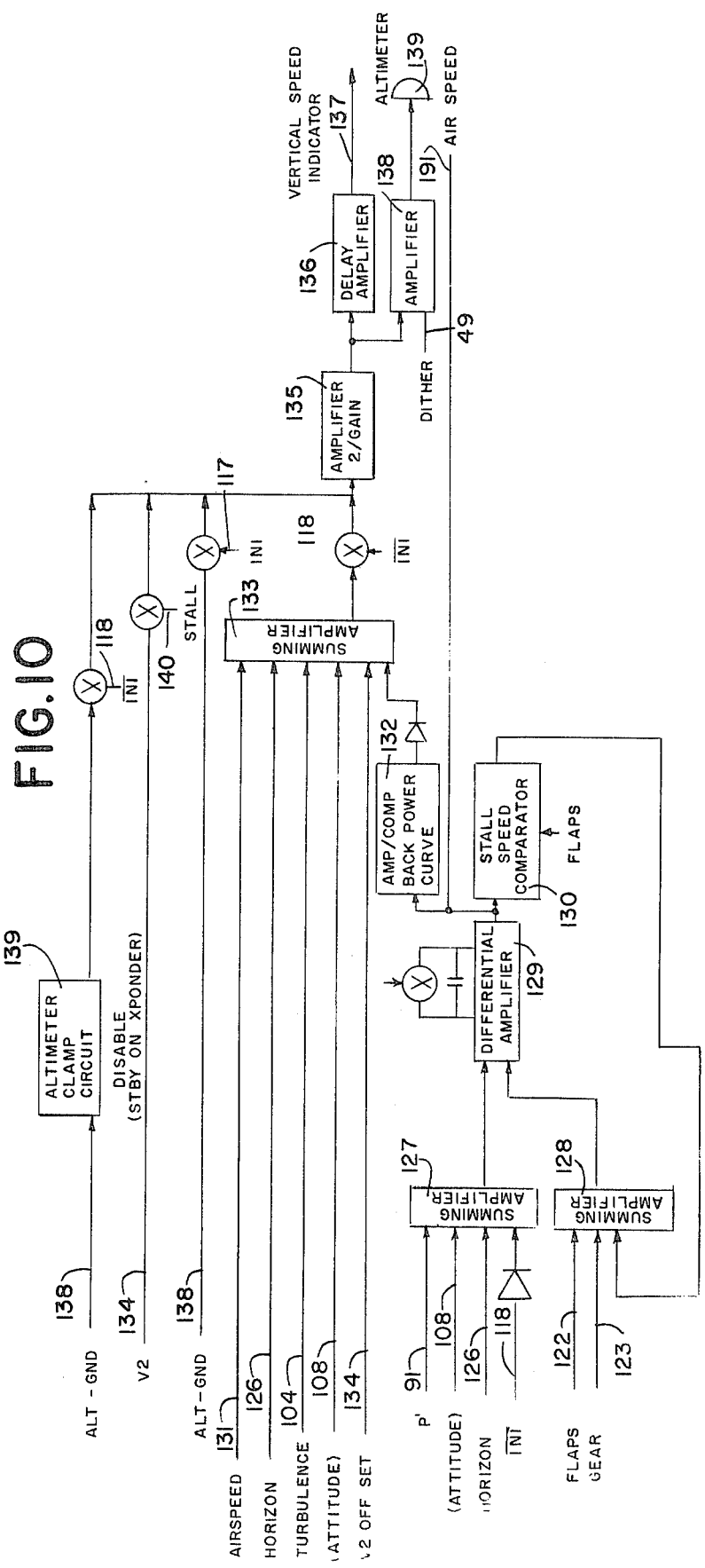

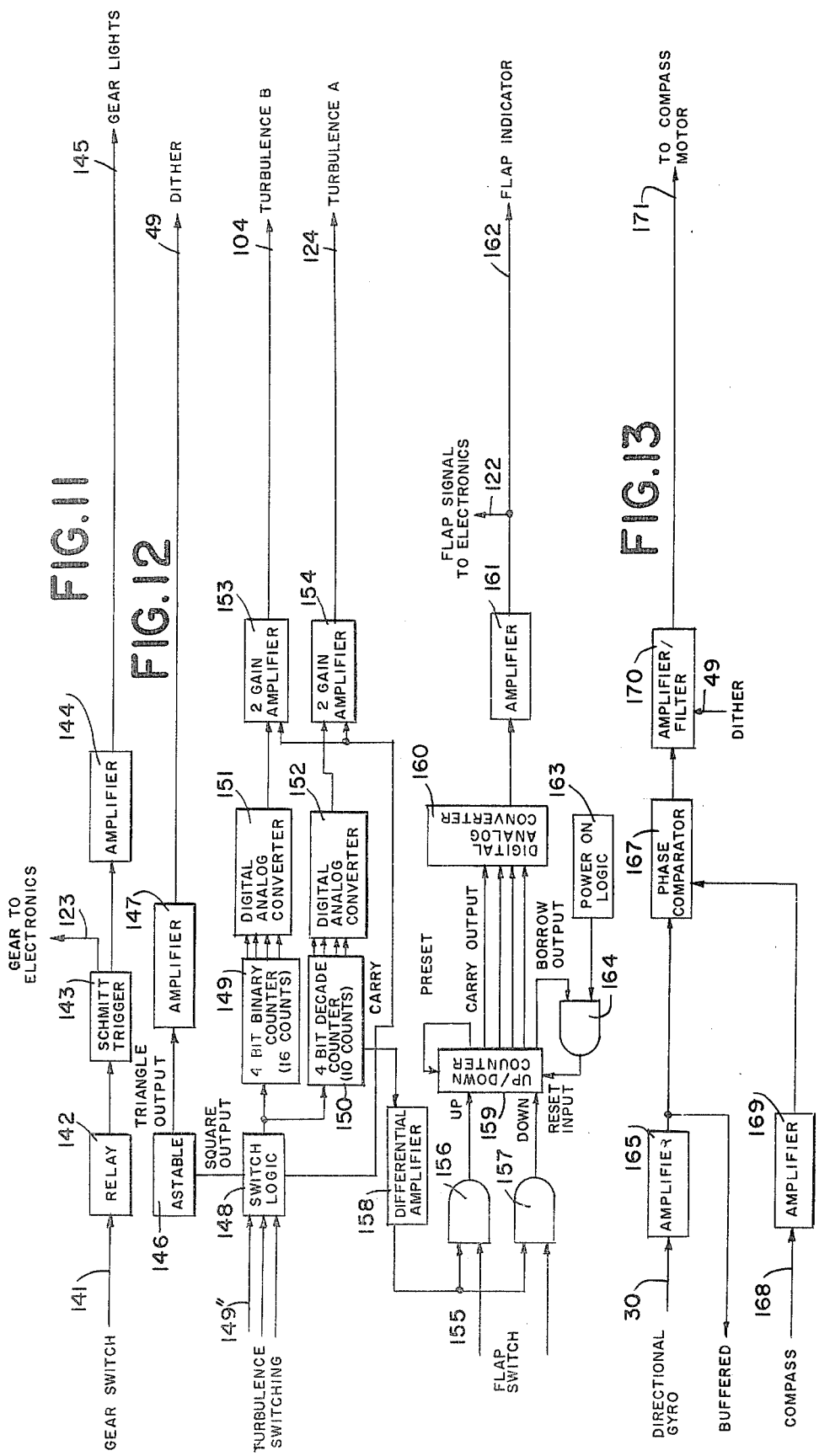

BFU SYSTEM BLOCK DIAGRAM

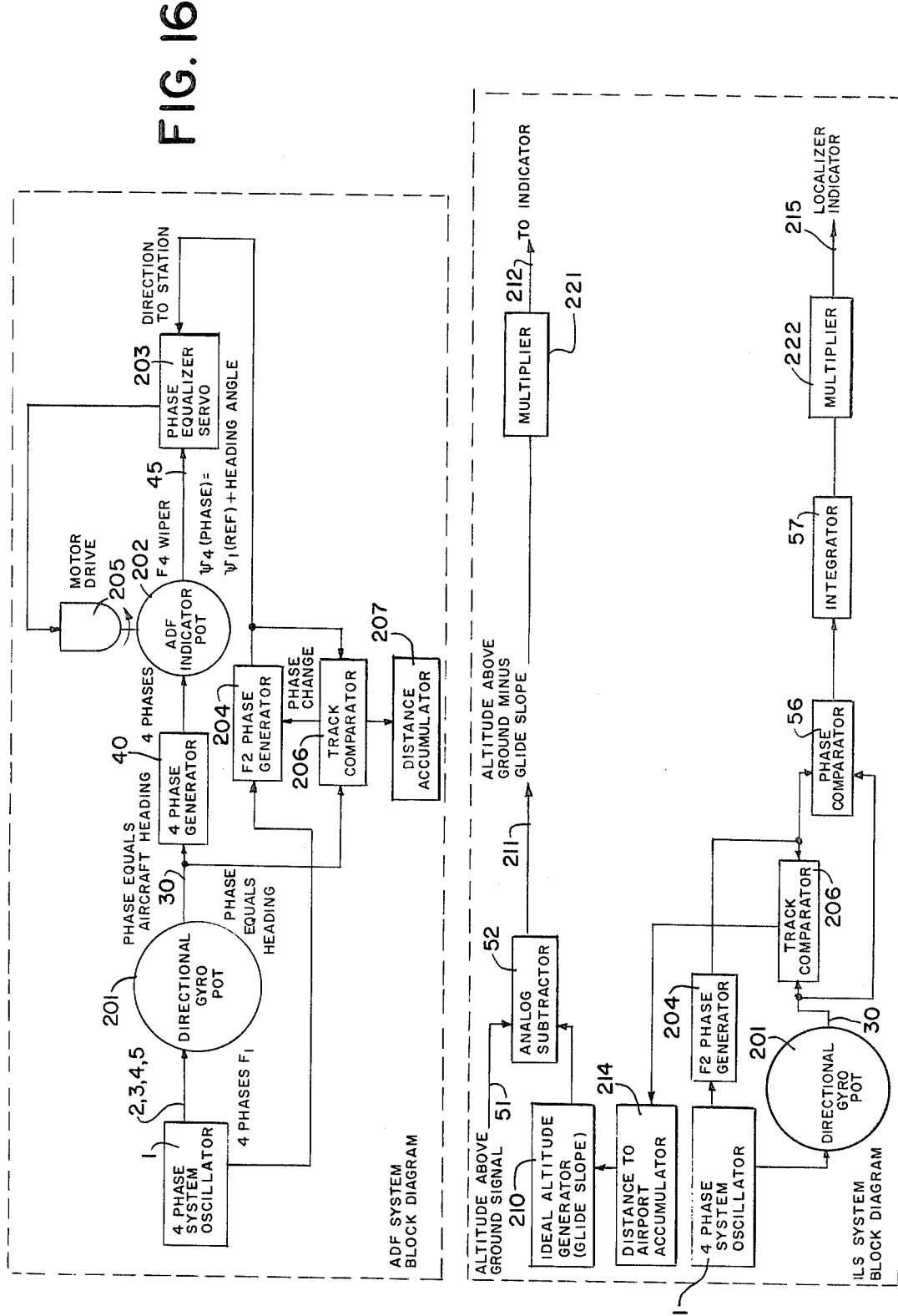

VOR SYSTEM BLOCK DIAGRAM

AIRCRAFT FLIGHT SIMULATING INSTRUMENT TRAINER

SUMMARY OF THE INVENTION

The present system is designed to meet the needs of flight training, for both VFR and IFR pilots. An aerodynamically realistic simulator treats the entire flight regime from slow flight and stalls to high speed cruise. The present system is a flight simulator as well as an instrument trainer.

The present simulator is a position based device, performing navigational computations based upon actual location of the "aircraft" in relation to the station, and its ground speed and track. Once a location is entered, the pilot can fly anywhere, just as he would in an aircraft. He is free to turn around, hold, intercept different radials, do a procedure turn or missed approach as he chooses. If the pilot does something wrong, the machine tracks his course and displays what he did, just as the aircraft instruments would do. The simulator simulates VOR/DME, ADF, and ILS navigational systems, and a 360 channel communications radio.

The present simulator is designed for use by student pilots and VFR pilots, as well as by those who are instrument rated. The flight simulator is aerodynamically realistic; it is math-modeled after a typical general aviation single engine aricraft. The simulator performs slow flight and realistic stalls and spins, and the simulator displays the drag effects of flap and gear use.

The flight simulator of the present invention contains a power curve, and has the ability to exchange airspeed for altitude and vice-versa, as in an aircraft. Instruction in basic and advanced flight maneuvers transfers directly into application in the aircraft.

The flight simulator of the present invention is modular in construction, with circuitry for each instrument and radio contained within the instrument itself or on the circuit board for the particular radio. The unit is used with any combination of modules, and is enlarged by merely plugging in the additional modules. Malfunctions in a circuit or component degrade only that particular function; the remainder of the unit continues to operate. Repairs are accomplished through an exchange of modules or instruments on site.

The flight simulator has the flexibility to fly any flight, using any en route chart and approach plate. All navigation frequencies are used as shown on the charts; only the communication frequency and transponder settings are adjusted for programming. Actual training flights, with the routes and airports used in the flight training curriculum, may be duplicated by the present simulator.

One object of this invention is the provision of an AC driven position simulator apparatus having an indicator for indicating simulated quantities, a drive connected to the indicator for changing the indicator to simulate movement, measuring means connected to the indicator for measuring conditions of the indicator, an oscillator supplying the measuring means with alternating voltages, cyclic means connected to the oscillator for producing cyclic voltages related to the alternating voltages, a sensor connected to the cyclic means and to the measuring means for sampling the alternating voltage during predetermined periods of oscillation, the sensor communicating with the drive for moving the drive according to sample voltages and shifting means for shifting the cyclic means and changing relationship of cycles to oscillator voltage alternations according to samples of alternating voltages.

Another object of the invention is the provision of an AC driven simulated aircraft instrument with potentiometer connected to the simulated instrument, an oscillator and a phase locked loop connected to the oscillator, counters connected to the oscillator for producing square waves from the phase with alternating voltages from the oscillator and shifters connected to the counters for shifting the counters.

The invention has as another object the provision of motor driven simulated instruments with dither means connected to power sources for producing minor cyclic perturbations in power supplied to the motors.

Another object of the invention is the provision of simulated instruments driven by DC motors with an oscillator connected to introduce cyclic variations in power sources for the motors.

Another object of the invention is the provision of an aircraft flight simulator with an AC current source, a reference current control connected to the AC current source, and a simulated throttle connected to the reference current control for controlling the reference current according to simulated throttle settings, a frequency converter connected to the reference current control, a counter connected to the frequency converter, a digital to analog converter connected to the counter, and a simulated fuel indicator connected to the digital to analog converter for indicating simulated fuel usage, a reset connected to the counter and a simulated fuel tank change switch connected to the reset for resetting the counter upon simulated fuel tank change switching.

Another object of the invention is the provision of a simulated aircraft control comprising a source of power, a simulated rudder control, a rudder amplifier, a simulated aileron control and an aileron amplifier, a simulated attitude indicator and an attitude indicator potentiometer, an attitude amplifier, a differential amplifier connected to the rudder amplifier and the aileron amplifier and a slip indicator connected to the differential amplifier for indicating slip according to differences in signals from the rudder and aileron amplifiers, a summing amplifier connected to the rudder amplifier, the aileron amplifier and the attitude indicator potentiometer amplifier and an attitude indicator motor drive connected to the summing amplifier for driving an attitude indicator.

A further object of the invention is the provision of a second summing amplifier connected to the rudder amplifier and the attitude indicator potentiometer amplifier as above described and a turn indicator connected to the second summing amplifier for indicating simulated turns, a simulated directional gyro indicator motor connected to the second summing amplifier for changing simulated directional gyro indications.

Another object of the invention is the provision of a third summing amplifier connected to the second summing amplifier as above described, an initiating switch means connected between the second and third summing amplifiers, and the third summing amplifier being connected to the rudder amplifier and to the aileron amplifier for controlling the operation of the second summing amplifier under simulated flight conditions of the simulated aircraft when the initiating switch connects the second and third summing amplifiers.

Another object of the invention is the provision of simulated aircraft instrument apparatus comprising a simulated horizon indicator, drive means connected to the horizon indicator and amplifier means connected to the drive means and initiating switch means connected to the amplifier for initiating operation of the horizon indicator upon simulated flight conditions, a summing amplifier connected to the amplifier, and to inputs from simulated power input means, simulated elevator input means, simulated flap position input means, and simulated gear position input means.

A further object of the invention is the provision of an attitude indicator potentiometer and an attitude indicator amplifier connected to the potentiometer and connected to the summing amplfer above described for providing a simulated attitude signal to the summing amplifier, and a turbulence signal means connected to the summing amplifier.

Another object of the invention is the provision of a flight simulation vertical speed summing amplifier having inputs connected to a simulated airspeed signal, a simulated horizon signal and a simulated attitude signal, and the vertical speed summing amplifier having an output and an initiating switch connected to the output, a delay amplifier connected to the summing amplifier, and a vertical speed indicator connected to the delay amplifier for indicating simulated vertical speed, and a simulated altimeter motor connected to the vertical speed summing amplifier for indicating simulated altitude.

A further object of the invention is the provision of simulated airspeed indicating apparatus with a first summing amplifier having inputs connected to a power signal, to an attitude signal, to a horizon signal and to a simulated flight initiating signal, a second summing amplifier having inputs connected to simulated flap position indicating signal and simulated gear position signal, a differential amplifier having input connected to the first and second summing amplifiers and a simulated airspeed indicating meter connected to the differential amplifier for indicating simulated airspeed.

Another object of the invention is the provision of a simulated stall speed comparator connected to an output of the differential amplifier and a flap signal control connected to the stall speed comparator, and the comparator further being connected to an input of the second summing amplifier as above described.

This invention has as another object the provision of a simulated aircraft instrument turbulence signal generator having an astable vibrator, first and second counters connected to the astable vibrator, and first and second digital to analog converters connected to the first and second counters, and first and second turbulence signal means connected to outputs of the first and second digital analog converters.

Another object of the invention is the provision of simulated flap indicating apparatus for simulated aircraft instruments having a source of pulses, first and second gates connected to a source of pulses, a simulated flap three-way switch having an up position connected to the first gate, a down position connected to the second gate, a reversible counter connected to the first and second gates, a digital to analog converter connected to the reversible counter, an amplifier connected to the digital to analog converter, and flap signal means connected to the amplifier, and a simulated flap indicator meter connected to the amplifier.

Another object of the invention is the provision of simulated compass driving apparatus for a simulated aircraft instrument system having a directional gyro indicator, a directional gyro potentiometer connected to the indicator, a compass indicator, and a compass potentiometer connected to the compass indicator, a source of alternating current connected to the potentiometers, a phase comparator connected to the potentiometer, and a power amplifier connected to the phase comparator, and dither introducing means connected to the power amplifier, and a compass driving motor connected to the power amplifier.

A further object of the invention is the provision of a simulated flight indicating system having a source of power, a simulated ignition switch connected to the source of power, engine operating signal means connected to the ignition switch, a comparator having inputs connected to a flap position signal and to a simulated airspeed signal, a stall signal means connected to an output of the comparator, a gate having an input connected to the engine and stall signal means, and having a second input connected to a flight indicating signal means and having an output connected to a taxi signal means signal means for producing a taxi signal in response to a comparison of simulated air speed and simulated flap position.

A further object of the invention is the provision of a comparator having inputs connected to a simulated ground altitude signal input and to a simulated altimeter potentiometer and connected to a gate for continuing a flight signal when more than a predetermined difference of signals exists at the inputs of the second comparator.

Another object of the invention is the provision of aircraft flight simulator apparatus having a plurality of indicators including speed indicators, heading indicators, attitude and roll indicators and separate means for driving the indicators, and disabling means connected to the drive means for driving the attitude and roll indicators and connected to the speed indicating means for preventing operation of the attitude and roll indicators until speed exceeds a predetermined minimum indication.

A further object of the invention is the provision of comparative means connected to the speed indicating means as above described, and a flap position indicating means connected to the comparative means for preventing operation of the attitude and roll indicators during predetermined relationships of the speed indicating means and the flap position indicating means.

A further object of the invention is the provision of stall enabling means connected to the disabling means as above described for preventing operation of the disabling means and maintaining operation of the attitude and roll indicators.

Another object of the invention is the provision of a comparator connected to the stall enabling means as above described, the comparator having a first input connected to a simulated ground altitude signal means and having a second input connected to an altitude signalling means for disabling the stall at a predetermined minimum altitude if a signal differential exists.

Another object of the invention is the provision of aircraft instrument flight simulator apparatus having an AC power supply, a four phase oscillator connected to the power supply for producing four separate phases at 90 degree offset intervals, a directional indicator potentiometer connected to the four phase oscillator, a wiper for selecting phase according to simulated heading, a four phase generator connected to the directional potentiometer.

A further object of the invention is the provision of an Automatic Direction Finder Indicator potentiometer connected to the four phase generator as above described, a second generator connected to the oscillator, a phase equalizer servo connected to the second generator and to the ADF indicator potentiometer, and an ADF motor drive connected to the indicator potentiometer and to the equalizer servo for changing the ADF indicator according to the equalizer servo, a track comparator having inputs connected to the directional potentiometer and to the second phase generator and having an output connected to a control of the second phase generator for changing phase from the second generator, and a distance accumulator connected to the track comparator.

A simulated Instrument Landing System having means for providing a signal of simulated altitude above ground, means for generating an ideal altitude, an analog subtractor connected to the altitude above ground signalling means and the ideal altitude signalling means, and an indicator connected to the analog subtractor for indicating deviation from desired glide slope, a four phase oscillator means for generating four separate oscillations of 90 degree displacement, a directional indicator potentiometer connected to the oscillator for selecting phases, a phase generator connected to the oscillator, a track comparator having inputs connected to the directional indicator potentiometer and to the phase generator, a distance accumulator connected to an output of the track comparator and connected to a control input of the desired altitude generator for controlling the ideal altitude generated according to the distance accumulated.

A further object of the invention is the provision of a phase comparator having inputs connected to the directional indicator potentiometer as above described and to the phase generator, and integrator connected to the output of the phase generator and a localizer indicator connected to the integrator.

Another object of the invention is the provision of a simulated aircraft VOR system having a four phase oscillator, a two phase generator connected to the oscillator, a directional indicator potentiometer connected to the oscillator, a track comparator connected to the phase generator and directional indicator potentiometer and a distance accumulator connected to the track comparator, the track comparator connected to a control terminal of the phase generator to adjust the phase generator.

A further object of the invention is the provision of an Omnidirectional Bearing Selector (OBS) potentiometer connected to the oscillator as above described and a first phase comparator connected to the phase generator and to the OBS potentiometer and a CDI connected to the first phase comparator, a second phase comparator connected to the phase generator and to the OBS potentiometer, and a signal means connected to the second comparator for conducting signals between the second comparator and the indicators.

Another object of this invention is the provision of an aircraft flight simulator instrument trainer comprising a master system oscillator for producing separate oscillations at ninety degree spaced intervals, a master phase locked oscillator connected to the master system oscillator for dividing oscillations of the master system oscillator, a preset divider connected to the master phase locked oscillator for dividing oscillations of the master phase locked oscillator, an accumulator connected to the divider for counting oscillations and multiplexer means connected to the accumulator means for changing the accumulator means, and input means connected to the multiplexer means and for inputting simulated navigational quantities to the accumulator.

A further object of the invention is the provision of the described simulator wherein the multiplexer adds and subtracts stored angle increments in the accumulator according to right and left signals from the navigational quantity input means.

A further object of the invention is the provision of the apparatus as described with a distance position accumulator counter for accumulating pulses indicative of distance from a station, a multiplexer connected to the distance position accumulator counter for adding and subtracting pulses according to signals from navigation quantity input means, and indicating means connected to the accumulator counter for indicating distance positions.

Another object of the invention is the provision of an aircraft flight simulator instrument training apparatus having a simulated automatic direction finding indicator, a multiple phase power source connected to the indicator, and phase sensing means connected to the indicator for sensing phase output from the indicator according to simulated aircraft heading on the indicator, a four phase generator having an input connected to the phase sensing means for producing from the sensed phase four outputs having phase separation, an automatic direction finding indicator having an indicator drive motor and a potentiometer connected to the indicator for aligning with indicated direction on the indicator, means connecting the phase separated outputs from the four phase generator to the automatic direction finding potentiometer, and wiper means on the potentiometer for selecting an output of the potentiometer, a phase comparator connected to the output of the automatic direction finding indicator and having an input connected to a signal of predetermined phase, a motor amplifier connected to an output of the phase comparator and connected to the automatic direction finder indicator motor for driving the motor and changing the indicated direction.

A further object of the invention is the provision of sensing means on a simulated aircraft direction indicator, a wind signal input connected to an amplifier for amplifying the sensed signal according to a wind signal, a second phase comparator having an input connected to the amplifier and having a second input connected to a means providing a signal of predetermined phase, a polarity sensitive V-F converter connected to an output of the phase comparator, the converter having first and second outputs, and multiplexer means connected to the outputs for controlling accumulated values related to simulated aircraft operational characteristics.

Another object of the invention is the provision of flight simulator aircraft instrument trainer localizer apparatus comprising a source of phase offset signals, a potentiometer connected to the source of signals, and connected to a simulated directional indicator for moving with the directional indicator, a phase comparator having inputs connected to the potentiometer and connected to a source of variable phase signals, an integrator having an input connected to an output of the phase comparator, and a localizer indicator connected to an output of the integrator.

A further object of the invention is the provision of an amplifier connected between the directional potentiometer and the phase comparator as above described, and a simulated wind control connected to the amplifier for varying the input to the phase comparator according to the selected wind.

These and further and other objects and features of the invention are apparent in the disclosure which includes the above and ongoing description.

BRIEF DESCRIPTION OF THE DRAWINGS

FIG. 3 is a schematic block diagram of the glide slope indicator system for the Instrument Landing System.

FIG. 4 is a schematic block diagram of the localizer indicator system for the instrument landing system.

FIG. 5 is a schematic block diagram for the simulated VOR/DME instruments. The simulated VOR/DME system uses the station moving system shown in the upper part of FIG. 2.

FIG. 6 is a schematic block diagram of the throttle controlled indicator and signal system.

FIG. 7 is a schematic diagram of the basic flight control indicator operating and signal providing system.

FIG. 8 is a schematic detail of the elevator signal producing system.

FIG. 9 is a schematic diagram of the horizon indicator operating system.

FIG. 10 is a schematic diagram of the simulated airspeed, vertical speed and altimeter indicator systems.

FIG. 11 is a schematic block diagram of the gear signal and indicator system.

FIG. 12 is a schematic block diagram of the monostable vibrator, dither and turbulence generation and the flap position indicating and signal generating system.

FIG. 13 is a schematic block diagram of the simulated compass drive system.

FIGS. 16, 17 and 18 are schematic block diagrams of the ADF system, the Instrument Landing System and the VOR system respectively.

DETAILED DESCRIPTION OF THE DRAWINGS

Figure 1:
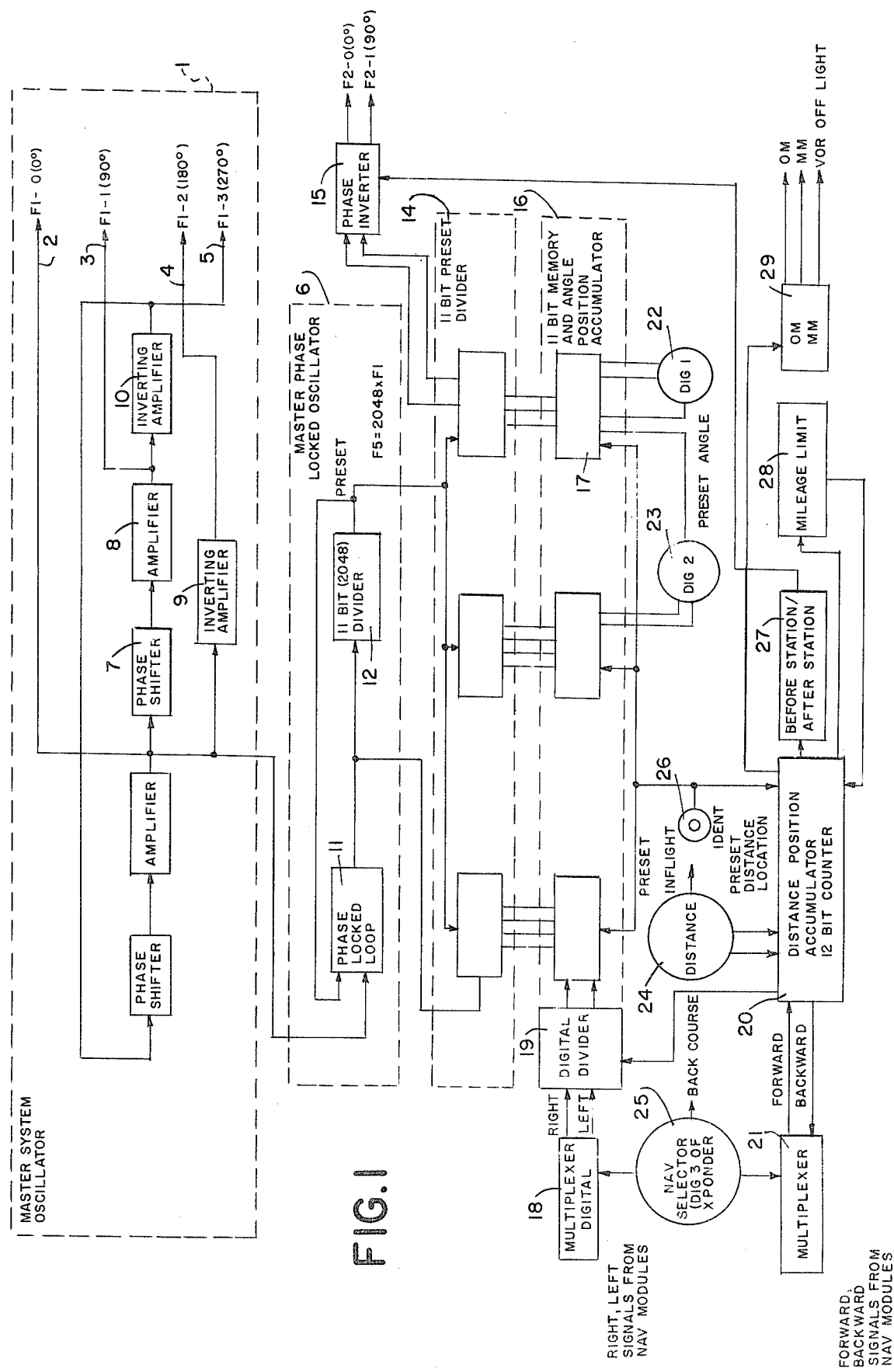
FIG. 1 is a block diagram of the AC phase generators, dividers and accumulators for simulated station position changing.

Referring to FIG. 1, a basic part of the flight simulator instrument trainer is shown. A master oscillator 1 has four outputs 2, 3, 4 and 5, which respectively produce alternating current signals in successive ninety degree phase increments. The master oscillator 1 and the phase locked oscillator 6 provide a first signal F1-0 at zero degrees reference phase. A phase shifter 7 and an amplifier 8 produces the F1-1 signal on output 3, which is ninety degrees delayed from the signal F1. An inverting amplifier 9 produces a signal F1-2 which is delayed by 180 degrees from signal F1. A second inverting amplifier fed the signal F1-1, produces the signal F1-3 which is 270 degrees delayed from the first signal F1.

The phase locked loop 11 operates in a conventional manner to produce the signal F1 which is fed to divider 12 which in turn feeds a new signal F5 to the 11 bit preset divider 14.

Divider 14 produces other signals which are fed to phase inverter 15 which produces signal F2 and F2-1, which is ninety degrees delayed from signal F2.

The F2 and F2-1 signals are used to control simulated instruments.

Angle position accumulator 16 has plural counters 17 which are fed signals from divider 14 and which are stepped by a digital multiplexer 18.

A distance position accumulator 20 is stepped forward and backward by a multiplexer 21 which receives signals from navigation modules and simulated instruments.

A digital divider 19 is fed signals from distance position accumulator to vary the effect of signals from multiplexer 18 on angle position accumulator 16 according to simulated distance from station.

A simulated transponder setting on the instrument panel controls angle presets 22 and 23, which are connected to the angle position accumulators to preset the accumulators. A similar distance preset 24 is connected to the distance position accumulator to preset a value in the accumulator according to the coded manual inputs on the instrument manual panel. A similar device 25 adjusts the multiplexers. An identification button 26 on the instrument panel is used to preset the accumulators.

A before station and after station indicator 27 is connected to the distance position accumulator for reversing the phase of F2-0 and F2-1 by 180°. A mileage limit device 28 controls the maximum distance accumulation. Control 29 controls the OM and MM light indicators.

Figure 2:
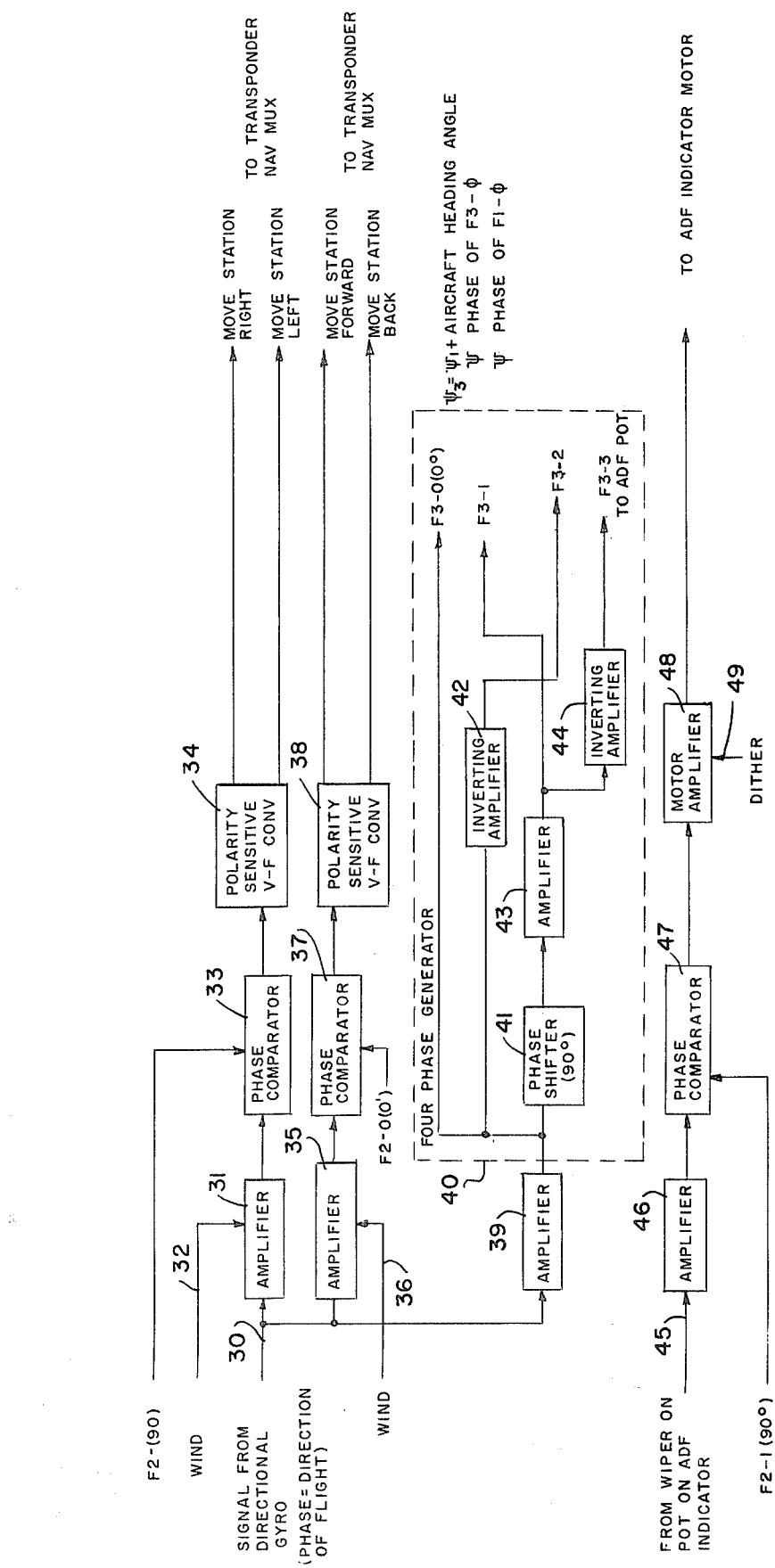
FIG. 2 is a schematic block diagram of the simulated Automatic Direction Finding system.

As shown in FIG. 2, a phase signal 30 selected by a potentiometer on a simulated directional gyro is amplified by amplifier 31 and is modified according to a predetermined wind signal 32. Phase comparator 33 compares the amplified and wind-modified phase signal 30 with signal F2-1 from phase inverter 15 in FIG. 1. A polarity sensitive VF converter 34 sends a signal to the digital multiplexer 18 to move the station left or right by stepping the accumulator 16 in FIG. 1 up or down.

Signal F2-0 from inverter 15 in FIG. 1 is fed to phase comparator 37.

The signal 30 is also amplified in amplifier 35 as controlled by the along course simulated wind component signal 36. Phase comparator 37 and polarity sensitive VF converter 38 feed signals to multiplexer 21 as shown in FIG. 1 to step the distance position accumulator forward or backward.

Signal 30 is also fed to amplifier 39 which in turn feeds the amplified signal to four phase generator 40 to produce four output signals, F3-0, F3-1, F3-2 and F3-3 at successive ninety degree phase offsets. The second four phase generator produces the amplified signal F3 which is similar in phase to signal 30 and using a ninety degree phase shifter 41, produces signal F3-1, ninety degrees delayed from signal F3-0. The 180 degree phase delayed signal F3-2 is produced by supplying the amplified signal 30 to an inverting amplifier 42.

The 270 degree phase delayed signal F3-3 is made by supplying the signal from phase shifter 41 to amplifier 43 and inverting amplifier 44.

The four phase offset signals F3-0, -1, -2 and -3 are connected to an automatic direction finding indicator potentiometer, and a wiper on the potentiometer which moves with the indicator on the automatic direction finder, selects a phase which is related to the indicated direction on the ADF. That signal from the ADF potentiometer wiper is amplified 46. Phase comparator 47 compares the phase of signal 45 with the reference phase F2-1 from phase inverter 15 in FIG. 1. The output of the phase comparator is fed to the motor amplifier 48 to which minor dither oscillations 49 are added, and the output of the motor amplifier 48 drives the automatic direction finding indicator motor.

The simulated glide slope indicator and localizer indicator are meters which are driven as indicated in FIGS. 3 and 4.

A digital to analog converter 50 receives inputs from distance counter 20 in FIG. 1. An altitude minus ground signal 51, as later will be described, is fed with the output of the digital to analog converter 50 to a subtracter 52. Digital to analog converter 58 also receives inputs from accumulator 20 and controls digital divider 59 to vary input to meter amplifier 53 according to simulated distance. The output of subtracter 52 is fed through divider 59 to meter amplifier 53, which drives the glide slope indicator, which then indicates whether the simulated aircraft is at the desired altitude at the simulated point in the glide slope.

A phase heading signal 30 from the simulated directional gyro potentiometer wiper is fed to an amplifier 54 whose characteristics are modified by a cross course wind signal 32. Phase signal F2-1 from phase inverter 15 in FIG. 1 and a signal from a back course switch are fed to phase inverter 55. Phase comparator 56 compares the directional phase signals with the signals from inverter 55 and supplies the result to integrator 57, and the output of the integrator drives the localizer indicator.

As shown in FIG. 5, a phase direction signal 60 from an OBS dial is fed to amplifier 61 and 62, and to phase comparators 63 and 64. The F2-1 (ninety degree signal) is also supplied to comparator 63 and the output of comparator 63 is supplied to filter 65 which supplies power to drive the meter movement in the simulated omni-indicator 66.

F2-0 (zero degree signal) is fed to comparator 64 and the output is fed to integrator 67, to analog comparator 68 and to gates 70 and 71.

A DME signal from comparator 69 is also fed to the gates. A signal 79 indicating VOR off controls switches. Amplifiers 73, 74 and 75 amplify the final signals to light the respective lights 76, 77 and 78.

FIGS. 6, 7 and 8 indicate variable control operations in the flight simulator instrument trainer.

Referring to FIG. 6, a throttle 80 is connected to a reference current unit 82 and engine off and empty tank signal 83 is connected to unit 82 to disable the unit when the engine is off and when a simulated fuel tank is empty.

One output of unit 82 is supplied to voltage to frequency converter 84 which in turn supplies its output to counter 86. Thus, counter 86 counts down at a rate which is controlled by the throttle setting. A digital to analog converter 87 changes the count in counter 86 to a DC signal which drives a simulated fuel indicator meter 88.

When counter 86 counts all of the way down, the fuel indicating signal in 88 is zero, which causes an empty tank signal in 83 to turn off unit 82.

A simulated tank change switch 89 resets counter 86 and begins again the countdown. The counting of the counter is used to produce an engine sound 90.

A second output of unit 82 supplies a power signal 91. Another output of unit 82 supplies a signal to drive a simulated power indicator 92.

Referring to FIG. 7, a simulated rudder 93 supplies a signal through a potentiometer to an amplifier 94 which in turn provides a rudder signal 95. A simulated aileron 96 provides a signal through a potentiometer to amplifier 97 to provide a simulated aileron signal 98. Both signals are fed to a differential amplifier 99 which provides power to drive a simulated slip indicator meter 100.

An attitude indicator potentiometer 101 connected to a simulated attitude indicator supplies a signal to an amplifer 102.

A summing amplifier 103 has inputs from amplifier 102, from rudder signal 95 and aileron signal 98, from power signal 91 and from turbulence signal 104 as will be described. The summing amplifier 103 supplies a signal to amplifier 105, which is supplied with an oscillating dither signal 39 to drive a motor for changing a simulated attitude indicator. A potentiometer on the attitude indicator is then connected to supply the signal 101.

The attitude indicator potentiometer signal 101 is provided to absolute value amplifier 107 to produce an attitude signal 108. The signal from the attitude amplifier 102 and from rudder amplifier 94 are fed to summing amplifier 109 and the rudder signal 95 and aileron signal 98 are fed to a summer 110, which in turn feeds the signal to summing amplifier 109 and the result is a signal which is fed to the turn indicator 111 to operate the turn indicator meter movement. Amplifier 112 takes the signal, applies dither 49 and uses the output to drive directional gyro motor 113 for changing the indicated direction of the gyro.

As shown in FIG. 8, a potentiometer on the simulated elevator control 114 supplies a signal to an amplifier 115 which in turn creates an elevator signal 116.

As later will be described, initiating signals 117 and inverse initiating signals 118 are provided to control switches to prevent operation of instruments indicative of in-flight operations while the simulated aircraft has simulated nonflying characteristics.

A stabilization augmentation (STAB AUG) signal 119 is operated to control a switch for supplying a signal from the attitude indicator potentiometer to the summing amplifier 103 which supplies the attitude indicator motor.

Referring to FIG. 9, signals developed as shown in FIGS. 6, 7 and 8, namely signals of attitude 108, power 91 and elevator 116 are applied to summing amplifier 120 with signals which will later be described such as negative offset 121 and amplified signals of flaps 122, gear 123, and turbulence A 124. Initiating signal 118 controls a switch to supply the output from summing amplifier 120 to amplifier 125, which provides a signal to drive the meter movement of horizon indicator 126.

As shown in FIG. 10, the power signal 91, attitude signal 108, horizon signal 126 and the inverse initiating signal 118, are fed to summing amplifier 127. The flaps signal 122 and the gear signal 123 are fed to summing amplifier 128. The outputs of summing amplifiers 127 and 128 are provided as inputs to differential amplifier 129 and stall speed comparator 130 produces a signal which is input to summing amplifier 128. The output of the differential amplifier 129 is also provided as an airspeed signal to drive the simulated airspeed indicator with a meter movement.

The airspeed signal is also fed to back power curve amplifier 132, whose output is provided to summing amplifier 133. Other inputs to the summing amplifier are airspeed 131, the horizon signal 126, turbulence 104, attitude 108 and positive offset 134. The output of summing amplifier 133 is provided to amplifier 135 via a switch which is controlled by the inverse initiating signal 118. A delay amplifier 136 produces the signal 137 which drives the meter which shows simulated vertical speed.

Amplifier 138 receives the inputs of amplifier 135 and a dither signal 49 to drive the altimeter motor 139.

An altitude above ground signal 138 is produced as later will be described. Initiating signal 117 controls a switch which supplies the altitude above ground signal as an input to the amplifier 135. Altimeter clamp circuit 139 supplies the signal through a switch which is controlled by the inverse initiating signal 118 to amplifier 135. Positive offset signal 134 is also supplied to amplifier 135 through a switch which is controlled by a stall signal 140 as later will be described.

As shown in FIG. 11, a simulated landing gear switch provides a signal 141 to time delay 142 which then provides a signal to Schmitt trigger 143, which in turn produces the gear signal 123 previously described.

Amplifier 144 receives the output signal from the Schmitt trigger and applies the signal to light gear lights 145.

As shown in FIG. 12, an astable vibrator 146 supplies a triangular output to amplifier 147 which provides dither signal 49.

The dither signal as previously described is applied to power amplifiers connected to small instrument drive motors to keep the instrument drives continually in motion with small perturbations to allow extremely fine movement of the indicators which the motors drive and to prevent frictional lag and inaccurate indications which might otherwise be caused by motors driven by power which would not have the oscillations.

A square output of astable vibrator 146 is provided to switch logic 148. Selected turbulence switch 149″ controls the desired turbulence. An output of the switch 148 is supplied to four bit binary counter with 16 counts 149 and four bit decade counter with ten counts 150. The outputs of those counters are then supplied to digital to analog converters 151 and 152, which supply analog signals to amplifiers 153 and 154.

An output from the switch logic 148 is also supplied to amplifiers 153 and 154, which produce the turbulence B signal 104 and the turbulence A signal 124 as supplied to the other instruments. An up-down off flap switch 155 provides power to gates 156 and 157, which also have inputs connected to amplifier 158 which received pulses from counter 150. Gates 156 and 157 alternatively supply up-down counter 159 which feeds digital to analog converter 160. Amplifier 161 at the output of converter 160 produces the flap signal 122 which is provided to the systems described in above figures and which is provided to the meter drive 162, which drives the simulated flap indicator.

Power on logic 163 is connected to gate 164 which resets the up-down counter 159 on application of system power.

As shown in FIG. 13, the signal from the directional gyro 30 is amplified in amplifier 165 and is provided to phase comparator 167.

A signal from a compass potentiometer 168 is amplified in amplifier 169 and is provided to phase comparator 167.

Amplifier and filter 170 to which a dither signal 49 is introduced supply the power to drive the compass motor 171.

Figures 14, 15:
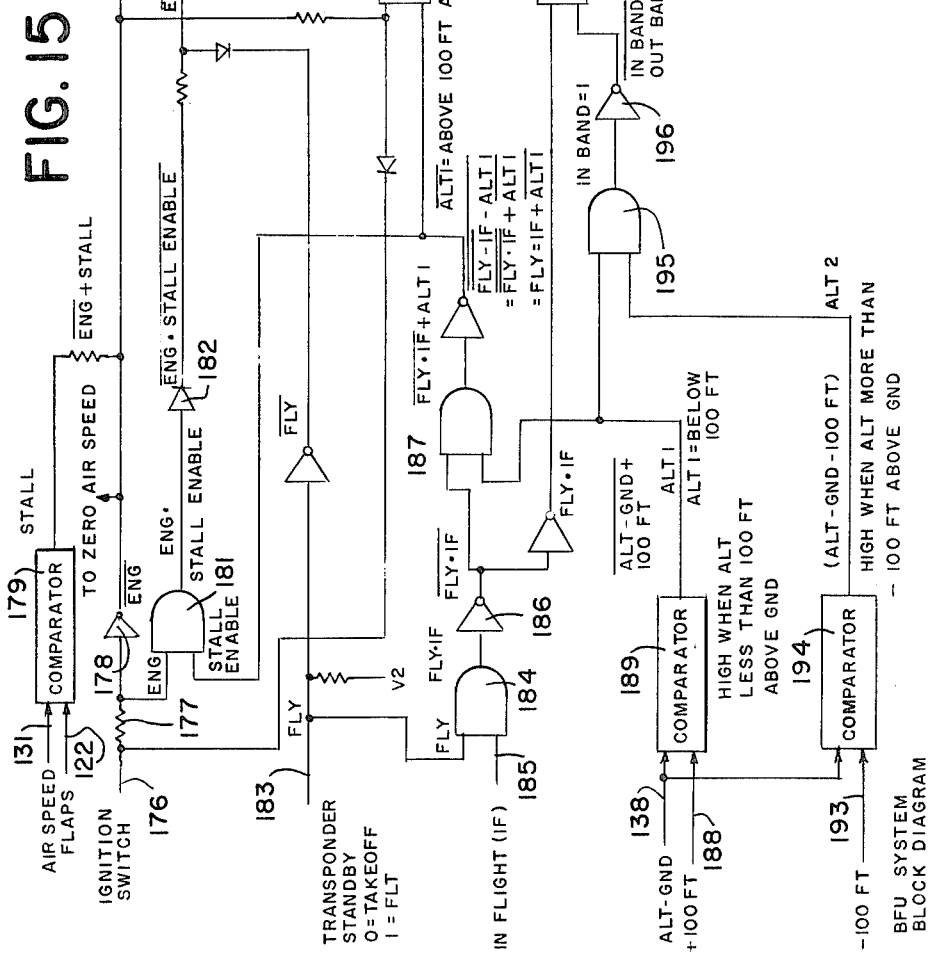
FIG. 14 is a schematic block diagram of the altitude above ground signal generating system.
FIG. 15 is a schematic block diagram of the simulated flight initiating, stall indicating and warning indicating systems.

An altitude signal 172 from a potentiometer on the simulated altimeter is supplied to amplifier 173 and then to summer 174, as shown in FIG. 14.

A ground signal 175 input on the simulated communication panel is supplied to inverting amplifier 176 and then to summer 174. The output of summer 174 is fed to amplifier 175′ which produces the altitude above ground signal 138 previously described.

Referring to FIG. 15, a simulated ignition switch 176 completes a circuit through resistor 177 and inverter 178 to provide an engine on and taxi signal.

Inverter 178 provides an inverted engine signal which is added to a stall signal from comparator 179. The combined signal is fed to one input of gate 180.

One input of gate 181 receives the engine signal and another receives the stall enable signal as will later be described.

Inverter 182 inverts the engine and stall enable signal from gate 181 and supplies that signal to the other input of gate 180. The output of gate 180 supplies the initiating signal 117 and the inverted initiating signal 118 as previously described.

A fly signal 183 is provided from a simulated transponder setting and is inverted and applied to an input of gate 180.

The fly signal is also supplied as an input to gate 184 which also receives an in-flight signal 185. The output fly and in-flight signal is inverted in element 186 and is fed to an input of gate 187.

The altitude above ground signal 138 is compared with a signal 188, indicative of a preselected altitude above ground in comparator 189. The resultant ALT 1 signal is applied as an input to gate 187. The output of gate 187 is inverted and is supplied as the stall enable signal to gate 181. The stall enable signal is also supplied to an input of gate 190, which also receives the engine signal from ignition switch 176. The resultant is a stall signal which is supplied to light driver 191 and stall light 192.

The altitude above ground signal 138 is also compared with a preselected minus altitude signal signal 193 in comparator 194 to produce an ALT 2 signal. The ALT 2 signal and ALT 1 signal are provided as inputs to gate 195 to produce an inband signal which is inverted in inverter 196 to produce an outband signal. The outband signal is supplied to gate 197 with the fly-inflight signal from gate 184. The output of gate 197 and the stall signal output of gate 190 are provided to or-gate 198 which supplied horn driver 199 to activate horn 200.

Figure 18:
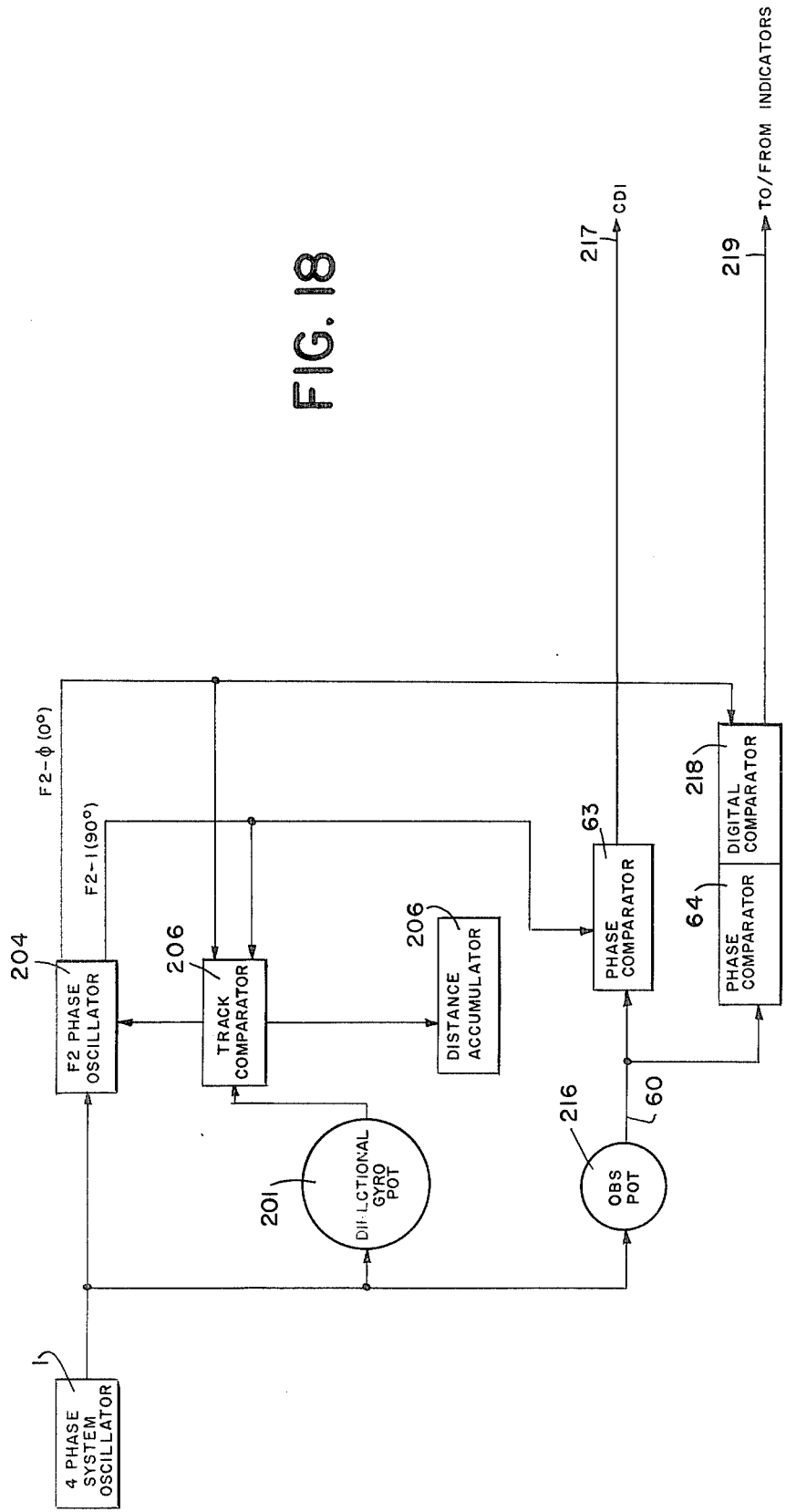

Having described the basic elements of the basic flight unit of the flight simulator trainer, FIGS. 16, 17 and 18 summarize the operations of the simulated automatic direction finding system, the simulated instrument landing system and the simulated VOR system.

FIG. 18 shows the simulated automatic direction finding system. The four phase system oscillator 1 produces four phases, 2, 3, 4 and 5 as shown in FIG. 1 which are connected to the directional gyro potentiometer 201. A wiper on the potentiometer picks off the phase signal 30 which is indicative of aircraft heading. The four phase generator 40 produces four ninety degree offset phases which are connected to the automatic direction finder indicator potentiometer 202. The signal 45 which the wiper on the ADF potentiometer picks off is fed to a phase equalizer servo 203.

One of the phases from the system oscillator 1 is supplied to a phase generator 204 which is a combination of the elements 6 and 14 shown in FIG. 1. The phase F2 from generator 204 is applied to the phase equalizer servo 203, which is represented by the phase comparator 47 in FIG. 2. The output of the phase equalizer servo is supplied to motor drive 205 which drives the ADF indicator, and consequently the ADF indicator potentiometer 202.

The output of the directional gyro potentiometer, phase signal 30 is also provided to track comparator 206. The output of phase generator 204 is applied to track comparator 206. Comparator 206 supplies a signal to distance accumulator 207 and changes the phase generated by phase generator 204.

Referring to FIG. 17, the instrument landing system generally shown in FIG. 3 is described. The altitude above ground signal 51 and the signal from ideal altitude generator 210 are supplied to analog subtractor 52. The signal 211 which is indicative of altitude above ground minus the guide slope is transmitted to glide slope indicator 212 to drive the meter which operates the glide slope indicator.

The signal from the track comparator is then fed to the distance to airport accumulator 214. The accumulated distance in accumulator 214 is fed to the glide slope generator 210 to select the predetermined ideal altitude at the distance to the airport from accumulator 214.

Phase comparator 56 receives signal 30 from potentiometer 201 and a phase signal from generator 204. Integrator 57 operates on the output of comparator 56 to provide a meter control signal to the localizer indicator 215.

Sensitivity multipliers 221 and 222 receive signals from distance accumulator 207, shown in FIG. 14, and vary signals to indicators 212 and 215 according to simulated distance from station.

As shown in FIG. 18, the VOR system indicators are supplied by the system oscillator 1, the directional gyro potentiometer 201, the two phase generator 204 and the track comparator 206. Oscillator 1 provides four phases to OBS potentiometer 216 and the phase signal 60 from the OBS potentiometer is provided to a phase comparator 63 which provides a signal 217 to drive the CDI omni-indicator.

Signal 60 is also supplied to phase comparator 64 which includes a digital comparator 218 which provides a signal 219 to activate the simulated to/from indicators on the CDI.

The system provides to the pilot a fully simulated aircraft instrument trainer with full simulations of flight conditions.

While the invention has been described with reference to specific embodiments, it will be obvious to those skilled in the art that modifications and variations of the invention may be constructed without departing from the invention.

The scope of the invention is defined in the following claims:

1. The AC driven position simulator apparatus comprising indicator means for indicating simulated quantities, drive means connected to the indicator means for changing the indicator means to simulate movement, measuring means connected to the indicator means for measuring conditions of the indicator means, oscillator means connected to the measuring means for supplying the measuring means with alternating voltages, cyclic means connected to the oscillator means for producing cyclic voltages related to the alternating voltages, sampling means connected to the cyclic means and to the measuring means for sampling the alternating voltage during predetermined periods of oscillation, the sampling means communicating with the drive means for moving the drive means according to sampled voltages and shifting means connected to the sampling means and to the cyclic means for shifting the cyclic means and changing relationship of cycles to oscillator voltage alternations according to samples of alternating voltages, wherein the indicator means comprises simulated aircraft instruments and wherein the drive means comprises means for driving the simulated aircraft instruments and wherein the measuring means comprises potentiometers connected to the simulated instruments, wherein the oscillator means comprises an oscillator and a phase locked loop connected to the oscillator, wherein the cyclic means comprises counters connected to the oscillator for producing square waves from the alternating voltages from the oscillator means, wherein the shifting means comprises a shift means connected to the counter means for shifting the counter means.

2. Simulated aircraft control apparatus comprising a source of power, a simulated rudder control, and a rudder amplifier connected to the simulated rudder control and to the source of power, and simulated aileron control and an aileron amplifier connected to the simulated aileron control and the source of power, a simulated attitude indicator and an attitude indicator potentiometer connected to the simulated attitude indicator and to the source of power, an attitude amplifier connected to the attitude indicator potentiometer and to the source of power, a differential amplifier connected to the rudder amplifier and the aileron amplifier and a slip indicator connected to the differential amplifier for indicating slip according to differences in rudder and aileron amplifiers, a summing amplifier connected to the rudder amplifier, the aileron amplifier and the attitude indicator potentiometer amplifier and an attitude indicator motor drive connected to the summing amplifier for driving an attitude indicator.

3. The apparatus of claim 2 further comprising a switch means connected to the summing amplifier and to the attitude indicator motor drive for preventing operation of the attitude indicator motor until the switch means is closed.

4. The apparatus of claim 3 further comprising a power amplifier connected between the summing amplifier and the attitude indicator motor drive, and dither means connected to the power amplifier for introducing perturbations in signal to the attitude indicator motor.

5. The apparatus of claim 4 further comprising a second summing amplifier connected to the rudder amplifier and the attitude indicator poteniometer amplifier and a turn indicator connected to the second summing amplifier for indicating simulated turns, a simulated heading direction indicator motor connected to the second summing amplifier for changing simulated directional heading indications.

6. The apparatus of claim 5 further comprising a power amplifier connected between the summing amplifier and the direction indicator motor and dither introducing means connected to the power amplifier for introducing dither to the direction indicator motor.

7. The apparatus of claim 5 further comprising a third summing amplifier connected to the second summing amplifier, an initiating switch connected between the second and third summing amplifiers for completing a circuit between the second and third summing amplifiers, and the third summing amplifier being connected to the rudder amplifier and to the aileron amplifier for controlling the operation of the second summing amplifier under simulated flight conditions of the simulated aircraft when the initiating switch connects the second and third summing amplifiers.

8. Flight simulation apparatus comprising a vertical speed summing amplifier having inputs connected to simulated airspeed signal means, simulated horizon signal means and simulated attitude signal means, and the vertical speed summing amplifier having an output and an initiating switch connected to the output, a delay amplifier connected to the summing amplifier, and a vertical speed indicator connected to the delay amplifier for indicating simulated vertical speed, and a simulated altimeter motor connected to the vertical speed summing amplifier for indicating simulated altitude.

9. The apparatus of claim 8 further comprising a simulated instrument, a motor means connected to the instrument for moving the instrument, power means connected to the motor for driving the motor and dither means connected to the power means for producing perturbations in power supplied to the motor means.

10. To the instrument motor drive of claim 9 wherein the motor means comprises a DC motor wherein the power means comprises a DC power source, and wherein the dither means comprises an astable vibrator means connectd to the power means for introducing variations in the power means.

11. The apparatus of claim 8 further comprising
an Ac current source, a reference current control means connected to the AC current source, and a simulated throttle connected to the reference current control means for controlling the reference current according to simulated throttle settings, a frequency converter connected to the reference current control, a counter connected to the frequency converter, a digital to analog converter connected to the counter, and a simulated fuel indicator connected to the digital to analog converter for indicating simulated fuel usage, a reset connected to the counter and a simulated fuel tank change switch connected to the reset for resetting the counter.

12. The apparatus of claim 11 further comprising an engine sound simulator connected to the counter for simulating engine sounds, and further comprising simulated engine on-off switch means connected to the reference control and empty tank indicating means connected to the reference current control.

13. The apparatus of claim 8 further comprising
a simulated horizon indicator, drive means connected to the horizon indicator and amplifier means connected to the drive means and switch means connected to the amplifier means for initiating operation of the horizon indicator upon simulated flight conditions, and summing amplifier means connected to the amplifier, the summing amplifier means being connected to inputs from simulated power input means, simulated elevator input means, simulated flap position input means, and simulated gear position input means.

14. The apparatus of claim 13 further comprising an attitude indicator potentiometer and an attitude indicator amplifier means connected to the potentiometer and connected to the summing amplifier for providing a simulated attitude signal to the summing amplifier, and further comprising turbulence signal means connected to the summing amplifier.

15. The apparatus of claim 8 further comprising a power amplifier connected to the simulated altimeter motor and a dither means connected to the power amplifier for introducing dither in the simulated altimeter motor.

16. Simulated airspeed indicating apparatus comprising a first summing amplifier having inputs connected to means for generating an engine power signal, to means for generating an attitude signal, to means for generating a horizon signal and to means for generating a simulated flight signal, a second summing amplifier having inputs connected to means for generating a simulated flap position indicating signal and simulated gear position signal, a differential amplifier having input connected to the first and second summing amplifiers and a simulated airspeed indicating meter connected to the differential amplifier for indicating simulated airspeed, further comprising a simulated stall speed comparator connected to an output of the differential amplifier and a flap signal control connected to the stall speed comparator, and the comparator further being connected to an input of the second summing amplifier.

17. A simulated aircraft instrument apparatus comprising turbulence signal generator apparatus having a monostable vibrator, first and second counters connected to the monostable vibrator, and first and second digital to analog converters connected to the first and second counters, and first and second turbulence signal means connected to outputs of the first and second digital analog converters.

18. The apparatus of claim 17 further comprising a dither amplifier connected to the monostable vibrator, a plurality of power amplifiers connected to the dither amplifier and a plurality of simulated indicator motors severally connected to the power amplifiers for producing dither in the simulated indicator drive motors.

19. Simulated flap indicating apparatus for simulated aircraft instruments comprising a source of pulses, first and second gates connected to a source of pulses, a simulated flap switch having an up position connected to the first gate, neutral, and a down position connected to the second gate, a reversible counter connected to the first and second gates, a digital to analog converter connected to the reversible counter, an amplifier connected to the digital to analog converter, and simulated flap indicator means connected to the amplifier.

* * * * *